United States Patent
Wang et al.

(10) Patent No.: US 11,872,482 B2
(45) Date of Patent: Jan. 16, 2024

(54) DISTRIBUTED MULTI-TERMINAL AND MULTI-NETWORK SUPPORTING SYSTEM FOR ANDROID ONLINE GAME

(71) Applicant: Hunan Duoxingyun Cloud Technology Co., Ltd., Changsha (CN)

(72) Inventors: Weixun Wang, Changsha (CN); Lin Xu, Changsha (CN); Sheng Huang, Changsha (CN); Chao Ma, Changsha (CN); Lei Zhou, Changsha (CN)

(73) Assignee: HUNAN DUOXINGYUN CLOUD TECHNOLOGY CO., LTD., Changsha (CN)

( * ) Notice: Subject to any disclaimer, the term of this patent is extended or adjusted under 35 U.S.C. 154(b) by 451 days.

(21) Appl. No.: 17/263,158

(22) PCT Filed: Oct. 16, 2019

(86) PCT No.: PCT/CN2019/111379
§ 371 (c)(1),
(2) Date: Jan. 26, 2021

(87) PCT Pub. No.: WO2020/093843
PCT Pub. Date: May 14, 2020

(65) Prior Publication Data
US 2021/0162299 A1    Jun. 3, 2021

(30) Foreign Application Priority Data

Nov. 11, 2018   (CN) .......................... 201811335622.4

(51) Int. Cl.
*A63F 13/35*      (2014.01)
*H04M 1/72427*   (2021.01)
(Continued)

(52) U.S. Cl.
CPC ............ *A63F 13/35* (2014.09); *H04L 67/025* (2013.01); *H04L 67/12* (2013.01); *H04L 67/131* (2022.05);
(Continued)

(58) Field of Classification Search
CPC .. A63F 13/35; H04M 1/72427; H04L 67/131; H04L 67/025; H04L 67/12; G06F 9/455
See application file for complete search history.

(56) References Cited

U.S. PATENT DOCUMENTS 9,451,043 B2 *  9/2016   Zhao ...................... H04L 67/59
9,843,533 B2    12/2017  Turovsky et al.
(Continued)

FOREIGN PATENT DOCUMENTS

CN          1937596 A      3/2007
CN        102571900 A      7/2012
(Continued)

OTHER PUBLICATIONS

Xia Yang, et al., Research and Implementation of Multiple Android Systems Based on the Container Technique, Journal of Chinese Computer Systems, 2016, pp. 1422-1427, vol. 37 No. 7.

*Primary Examiner* — William H McCulloch, Jr.
*Assistant Examiner* — Ankit B Doshi
(74) *Attorney, Agent, or Firm* — Bayramoglu Law Offices LLC

(57) ABSTRACT

A distributed multi-terminal and multi-network supporting system for an Android online game App includes an online game server, an Android online game App distributed video and remote control server, and an Android online game video and remote control mode client. The online game server is configured to store Android online game account information and game information of a user. The Android online game App distributed video and remote control server
(Continued)

establishes network communication with the online game server, and the Android online game video and remote control mode client, respectively. The Android online game App distributed video and remote control server includes an enhanced ARM CPU version Android OS, an enhanced multi-instance ARM Linux Docker container, a host server, and an enhanced ARM CPU version Linux. A distributed multi-terminal and multi-network supporting method for an Android online game App based on the distributed multi-terminal and multi-network supporting system is provided.

7 Claims, 3 Drawing Sheets

(51) Int. Cl.
H04L 67/025 (2022.01)
H04L 67/12 (2022.01)
H04L 67/131 (2022.01)
G06F 9/455 (2018.01)

(52) U.S. Cl.
CPC ......... *H04M 1/72427* (2021.01); *G06F 9/455* (2013.01)

(56) References Cited

U.S. PATENT DOCUMENTS

| 2014/0006129 A1* | 1/2014 | Heath | G06Q 30/02 705/14.23 |
| 2015/0081764 A1* | 3/2015 | Zhao | G06F 9/452 709/203 |
| 2015/0256481 A1 | 9/2015 | Turovsky et al. | |
| 2021/0084117 A1* | 3/2021 | Ovadia | H04L 67/34 |
| 2022/0197773 A1* | 6/2022 | Butler | G06F 9/5038 |

FOREIGN PATENT DOCUMENTS

| CN | 103023872 A | 4/2013 |
| CN | 103888485 A | 6/2014 |
| CN | 105357256 A | 2/2016 |
| CN | 105491021 A | 4/2016 |
| CN | 106776067 A | 5/2017 |
| CN | 108021608 A | 5/2018 |
| CN | 108268304 A | 7/2018 |
| CN | 108388460 A | 8/2018 |
| CN | 109587118 A | 4/2019 |

* cited by examiner

DISTRIBUTED MULTI-TERMINAL AND MULTI-NETWORK SUPPORTING SYSTEM FOR ANDROID ONLINE GAME

CROSS REFERENCE TO THE RELATED APPLICATIONS

This application is the national phase entry of International Application No. PCT/CN2019/111379, filed on Oct. 16, 2019, which is based upon and claims priority to Chinese Patent Application No. 201811335622.4, filed on Nov. 11, 2018, the entire contents of which are incorporated herein by reference.

TECHNICAL FIELD

The present invention relates to a distributed multi-terminal and multi-network supporting system for an Android online game application (App) and a method based on the aforementioned system.

BACKGROUND

At present, online games running on the Android platform (hereinafter referred to as Android online games) are popular and attract a large number of players due to a profusion of game plots. So far, the operating architectures for the Android online games mainly include the client/server mode, and the GPU/CPU virtualization mode.

In the client/server mode, the system architecture diagram thereof is shown in FIG. 1. In the architecture shown in FIG. 1, the client-side App of the Android online game can only run on smart phones and tablet computers based on the Android operating system (OS) platform, which causes that the graphics processing (OpenGL) of the client-side App of the Android online game is limited to be run and processed only on the hardware configured with graphics processing unit (hereinafter referred to as GPU) and central processing unit (hereinafter referred to as CPU) of the smart phones and the tablet computers based on the Android OS platform.

The GPU and CPU of the smart phones and tablet computers based on the Android OS platform are weaker in performance than the GPU and CPU of the computer servers and personal computers. Although the screen of games running on the computer servers and personal computers have been true to life, the graphics effects of the prior Android online games are much inferior to the screen of PC games due to the weak performance.

In the GPU/CPU virtualization mode, the advanced reduced-instruction-set-computer machine (ARM) CPU virtualization technology cooperates with the GPU virtualization technology configured with GPU virtualized driver to run the Android OS on the Kernel Virtual Machine (KVM) on ARM Linux, to modify the graphics rendering pipeline in the Android OS, and to perform the graphic distributed remote processing. The GPU virtualization technology requires the GPU card supporting the GPU virtualization and the matched GPU virtualized driver. The system architecture of the GPU/CPU virtualization mode is shown in FIG. 2.

The processing flow of the Android online game in the architecture shown in FIG. 2 is as follows: the Android online game App calls the graphics framework and the runtime of the Android OS platform, acquires the App graphics calls through the modified Android graphics runtime, and sends the App graphics calls of the Android online game to the smart phone through network communication. The client-side App on the smart phone receives the graphics calls, and replays the graphics calls to the Android OS of the smart phone for graphic display processing. These graphics calls are processed and displayed by the conventional Linux kernel GPU driver of the smart phone and the GPU of the smart phone.

The GPU/CPU virtualization technologies mainly rely on OS virtualization technology, which has problems of poor performance and high cost of the network and GPU. As a result, the graphics process of the graphics calls are still performed by the GPU of the smart phone, the graphics display effect is still limited by the GPU of the smart phone and still cannot achieve the realistic effect.

SUMMARY

The purposes of the present invention are to provide a system for achieving cinematically realistic graphic effects of the Android online game App as if it is displayed on the PC, and for extending the Android online game App to support multiple terminals and multiple networks.

In order to achieve the above purposes, a technical solution of the present invention is to provide a distributed multi-terminal and multi-network supporting system for an Android online game App, including:

an online game server, wherein the online game server is configured to store Android online game account information and game information (such as contents and plots of the game, etc.) of a user, and serve and respond to the Android online game App; and an Android online game App distributed video and remote control server, wherein the Android online game App distributed video and remote control server establishes network communication with the Android online game server, and an Android online game video and remote control mode client, respectively, and the Android online game App distributed video and remote control server includes an enhanced ARM CPU version Android OS, an enhanced multi-instance ARM Linux Docker container, a host server, and an enhanced ARM CPU version Linux; the ARM Linux Docker container and the host server run on the ARM CPU version Linux;

wherein, multiple instances of the ARM CPU version Android OS run in each ARM Linux Docker container, and the Android online game App runs on the enhanced ARM CPU version Android OS.

Preferably, the host server is configured as an interactive in-and-out port between the Android online game App, the Android online game App distributed video and remote control server, and the Android online game server. The host server of the Android online game App distributed video and remote control server acquires the Android online game account information and game information of the corresponding user from the online game server, and sends the Android online game account information and game information to the Android online game App on the enhanced ARM CPU version Android OS running in the ARM Linux Docker container to enable the Android online game App to run interactively with the Android online game server. When the Android online game App runs, the corresponding Android online game account information is modified, and then stored by the Android online game server.

Moreover, the host server is further configured as an interactive port between the Android online game App, the Android online game App distributed video and remote control server, and the Android online game video and remote control mode client. When the Android online game App runs, the host server converts the graphic display of the Android online game App from the Open Graphics Library for Embedded Systems (OpenGL_ES) command to a single-channel or multi-channel video stream through the device mapping of the Docker container and the service assistance of the Binder, and sends the single-channel or multi-channel video stream to the Android online game video and remote control mode client. The host server receives the control information uploaded by the Android online game video and remote control mode client, and sends the control information to the Android online game App running in the ARM Linux Docker container.

The host server serves the Android online game video and remote control mode client. The Android online game video and remote control mode client runs on the mobile terminal device, and plays the video stream received from the Android online game App distributed video and remote control server. Meanwhile, the Android online game video and remote control mode client is configured to acquire the control information and upload the control information to the Android online game App distributed video and remote control server.

Preferably, the host server includes a display control unit, a video stream service layer, a control management unit, a control service layer, a Mesa library, a Direct Rendering Manager Library (LibDRM) and a Video Acceleration Application Programming Interface (VAAPI) library.

Preferably, the Android online game video and remote control mode client is further configured to acquire the performance information of the mobile terminal device, and the network status information of the Android online game video and remote control mode client communicating with the Android online game App distributed video and remote control server, and upload the acquired performance information and network status information to the Android online game App distributed video and remote control server. The Android online game App distributed video and remote control server adjusts the size of the video stream to be transmitted and the network transmission parameter in real time according to the received performance information and network status information.

Preferably, the Android online game video and remote control mode client includes a video stream client library, a control module of an operating system run by a mobile terminal device with the Android online game video and remote control mode client, a terminal, and a network information acquisition module.

Another technical solution of the present invention is to provide a distributed multi-terminal and multi-network supporting method for an Android online game App based on the system mentioned, including the following steps:

step 1: sending the login information to the Android online game App distributed video and remote control server by the user, and acquiring the corresponding Android online game account information and game information stored in the Android online game server according to the login information by the host server;

step 2: sending the Android online game account information and game information to an instance of the enhanced ARM CPU version Android OS running in the ARM Linux Docker container by the host server, and running the Android online game App on the enhanced ARM CPU version Android OS according to the Android online game account information and online game content information;

step 3: when the Android online game App runs, converting the graphic display of the Android online game from the OpenGL_ES command to a single-channel or multi-channel video stream by the host server through the device mapping of the Docker container and the service assistance of the Binder, and sending the single-channel or multi-channel video stream to the Android online game video and remote control mode client running on the mobile terminal device used by the user;

step 4: receiving and displaying the video stream on the current mobile terminal device by the Android online game video and remote control mode client, acquiring the control information executed by the user based on the displayed screen, and uploading the acquired control information to the host server; and step 5: receiving and sending the control information, by the host server, to the Android online game App running in the ARM Linux Docker container.

Preferably, the distributed multi-terminal and multi-network supporting method for the Android online game App further includes the following step:

during the working process, further acquiring, by the Android online game video and remote control mode client, the performance information of the mobile terminal device, and the network status information of the Android online game video and remote control mode client communicating with the Android online game App distributed video and remote control server, and uploading the acquired performance information and network status information to the Android online game App distributed video and remote control server, and adjusting the size of the video stream to be transmitted and the network transmission parameter in real time by the Android online game App distributed video and remote control server according to the received performance information and network status information.

The present invention has the following advantages:

(1) The Android online game App can be implemented through high-performance server ARM CPU and high-performance GPU, so that the Android online game App achieves cinematically realistic graphic effects supported by a GPU of a server, while being able to support the high-performance graphic processing required by augmented reality (AR) and virtual reality (VR).

(2) The Android online game App is well applicable to various network environments and OS platforms of various user-side smart terminals, so that the user can play the games with the realistic graphic effects on various network environments and OS platforms of various smart terminals.

(3) The present invention has good performance and low cost, without the input and output (IO) overhead of OS virtualization, it does not require the virtualized dedicated GPU card and dedicated OS as well as the dedicated GPU virtualized driver.

DETAILED DESCRIPTION OF THE EMBODIMENTS

Figure 1:
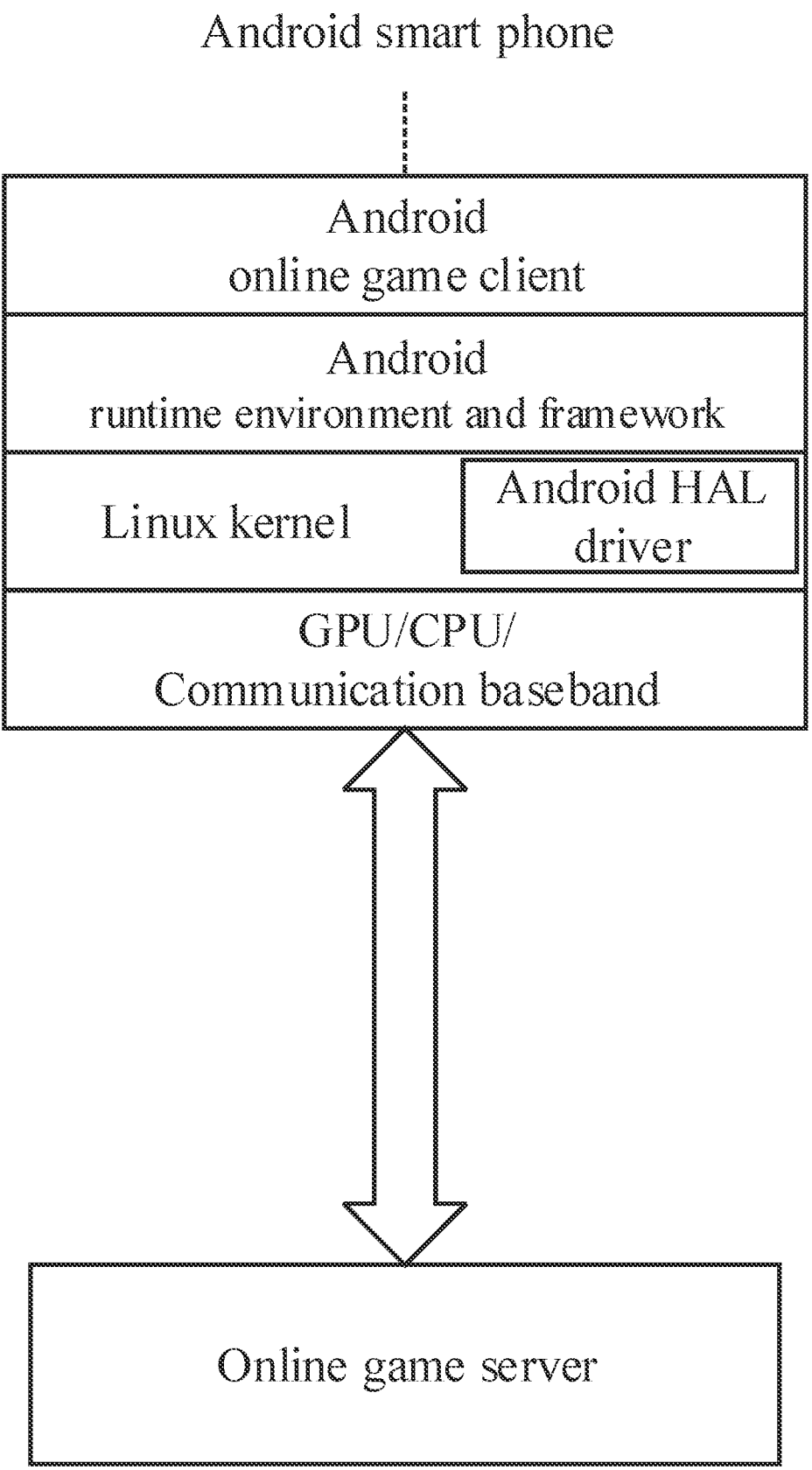
FIG. 1 shows a prior system architecture of the client/server mode of the Android online game.
Figure 2:
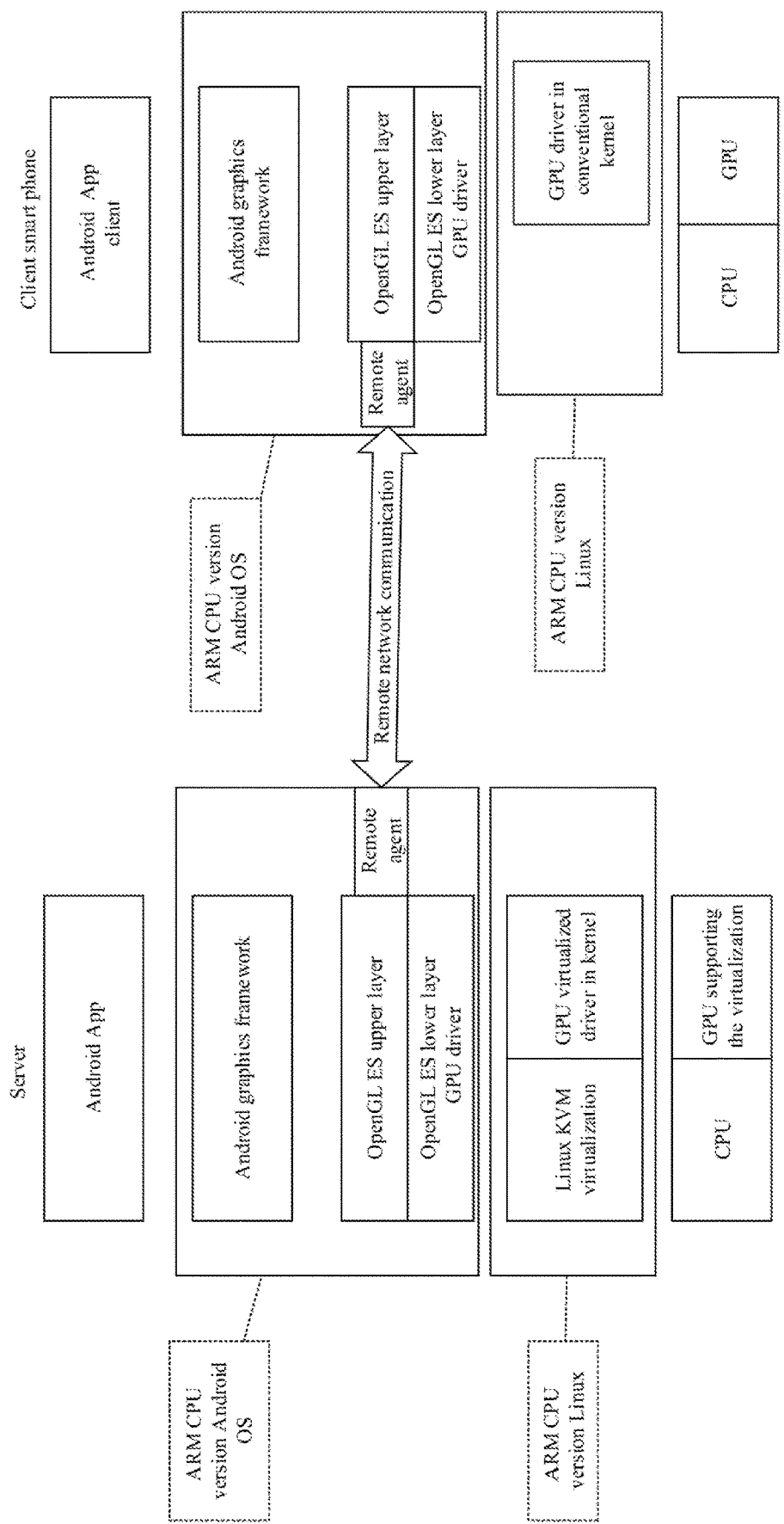
FIG. 2 shows another prior system architecture diagram of the Android online game.
Figure 3:
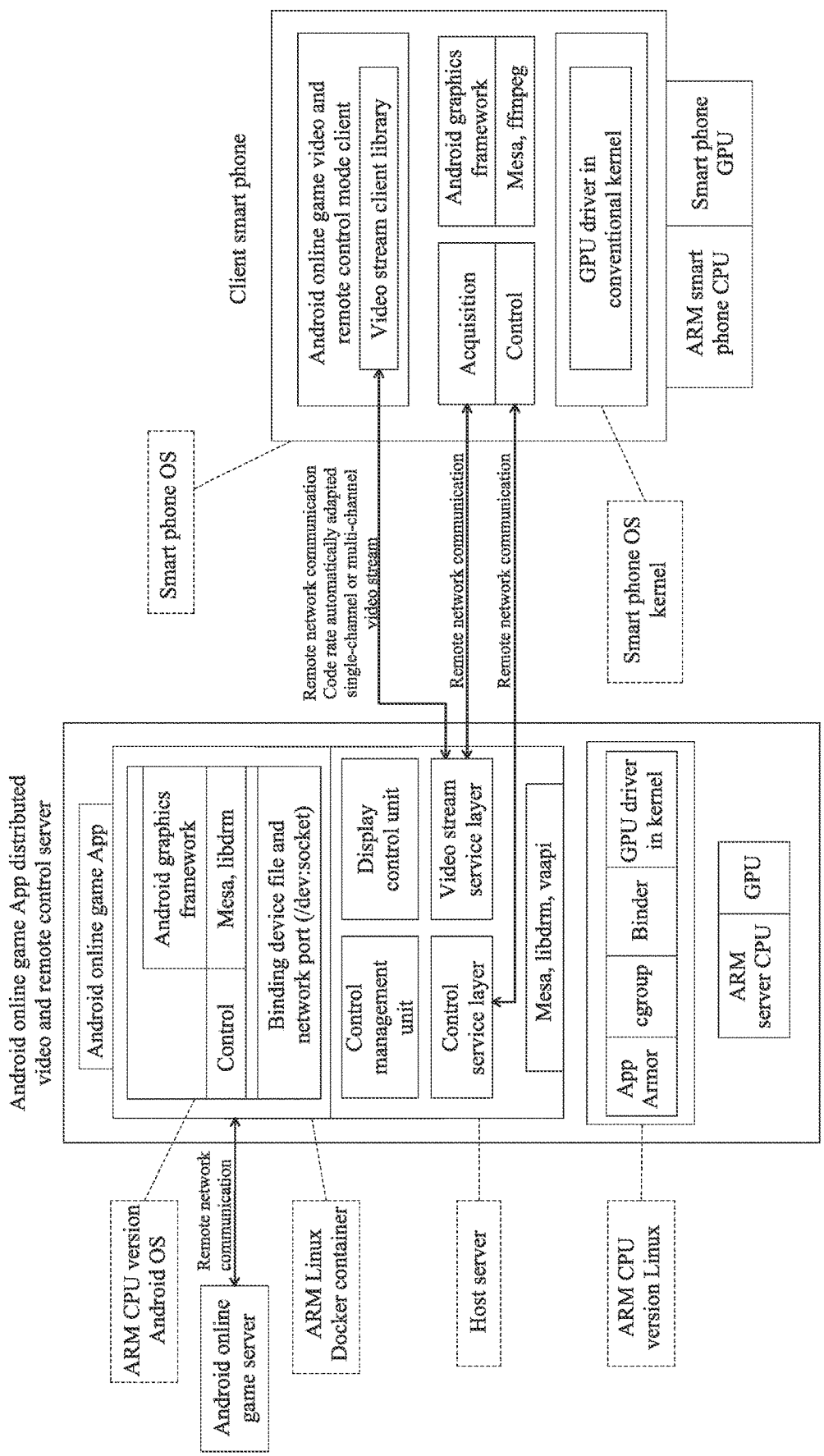
FIG. 3 shows a system architecture of the present invention.

In order to understand the present invention clearly and easily, the preferred embodiments are illustrated below in detail in conjunction with the drawings.

With the development of network technology, the present invention provides a distributed multi-terminal and multi-network supporting system for an Android online game App, which refers to the prior art, patent number ZL 200610026512.0, named as Multi-terminal And Multi-network Supporting System and Method For Interactive Entertainment Application Extension. The present invention transforms the Android OS, namely the operating platform of the Android online game App, into a distributed system that includes an online game server, an Android online game App distributed video and remote control server, and an Android online game video and remote control mode client.

The online game server has the same function as the prior online game server, and is configured to store the Android online game account information and game information (such as contents and plots of a game, etc.) of the user, and serve and respond to the Android online game App.

The Android online game App distributed video and remote control server establishes network communication with the online game server, and the Android online game video and remote control mode client, respectively, and includes an enhanced ARM CPU version Android OS, an enhanced multi-instance ARM Linux Docker container, a host server, and an enhanced ARM CPU version Linux.

Multiple instances of the enhanced ARM CPU version Android OS run in each ARM Linux Docker container, and the Android online game App runs on the ARM CPU version Android OS. Specifically, the enhanced ARM CPU version Android OS is implemented as follows: customizing the Initialization (Init) to start in the Docker container environment of the host Linux, customizing the bionic to add the system call, customizing the SystemServer adaptation service, customizing the attribute system, using the Advanced Linux Sound Architecture (ALSA) to support the sound, and adapting the network; adding the self-contained Mesa, completing the rendering through the cooperation of LibDRM, Low Level Virtual Machine (LLVM) and Mesa, and transmitting the buffer object (BO) and its identification name and the refreshing event of the synthesized Direct Rendering Manager Library (DRM) by writing the socket.

The enhanced multi-instance ARM Linux Docker container is implemented as follows: adding to the function of dynamically adding and deleting the binder device; performing the custom modification and the runtime environment construction for the mirror image of the Android OS in the Docker; adding the ARM Linux host hooks mechanism to the Docker, providing the hooks before and after the startup and shutdown of the container, and providing the override of the control group (cgroup) during the running time, so as to realize that multiple Android OS instances run in the Docker container.

The enhanced ARM CPU version Linux is implemented as follows: modifying the driving of the binder, adding the multi-binder device support, adding the GPU support of the Linux cgroups, enabling AppArmor, enhancing the security of the container and the host Linux. Additionally, the Linux includes the GPU driver supporting the ARM CPU.

The host server is configured as an interactive in-and-out port between the Android online game App distributed video and remote control server and the online game server. The host server acquires the Android online game account information and game information of the corresponding user from the online game server, and sends the Android online game account information and game information to the Android online game App on the enhanced ARM CPU version Android OS running in the ARM Linux Docker container such that the Android online game App runs interactively with the Android online game server. The host server modifies the corresponding Android online game account information according to the running result of the Android online game App, and the corresponding Android online game account information is stored by the online game server.

Moreover, the host server is further configured as an interactive port between the Android online game App distributed video and remote control server and the Android online game video and remote control mode client. When the Android online game runs, the host server converts the graphic display of the Android online game from the OpenGL_ES command to a single-channel or multi-channel video stream through the device mapping of the Docker container and the service assistance of the Binder, and sends the single-channel or multi-channel video stream to the Android online game video and remote control mode client. The host server receives the control information uploaded by the Android online game video and remote control mode client, and sends the control information to the Android online game App running in the ARM Linux Docker container.

In an embodiment of the present invention, the host server includes a display control unit, a video stream service layer, a control management unit, a control service layer, a Mesa library, a LibDRM and a VAAPI library. The host server is implemented as follows: realizing receiving and sending the BO of displaying the DRM by the socket, modifying the socket based on the Host side of the anbox to receive and send the input event. The host server as the interactive port between the server and the client is specifically implemented as follows: mainly developing a protocol for compressing the video stream of BO and interacting with the Android online game video and remote control mode client, receiving the socket of controlling the input and the sensor and the socket of sending the compressed video stream; dynamically adjusts the format and the parameter of the video stream and the communication layer protocol parameter according to the received information acquired and uploaded by the Android online game video and remote control mode client; compressing and transmitting two-channel or multi-channel video streams as needed by the visual angle when running the AR or VR online game App.

The Android online game video and remote control mode client runs on the mobile terminal device, and plays the video stream received from the Android online game App distributed video and remote control server. Meanwhile, the Android online game video and remote control mode client is configured to acquire the control information and upload the control information to the Android online game App distributed video and remote control server. In an embodiment of the present invention, the Android online game video and remote control mode client includes a video stream client library, a control module of an operating system run by a mobile terminal device with the Android online game video and remote control mode client, a terminal, and a network information acquisition module.

The Android online game video and remote control mode client is implemented as follows: realizing the control protocol of a display, a mouse, a keyboard, a touch control and a sensor, receiving and playing the video stream, acquire the form and format of the type of the user terminal, and constantly monitoring and measuring the network delay, packet loss and other information from the server to the smart phone device with the client while reporting the network delay and packet loss to the host server. The Android online game video and remote control mode client further supports the smart phone OS running on Android OS, iOS, Sailfish OS and other terminals.

The present invention provides a distributed multi-terminal and multi-network supporting method for an Android online game App, including the following steps:

Step 1: the user sends the login information to the Android online game App distributed video and remote control server, and the host server obtains the corresponding Android online game account information and game information stored in the online game server according to the login information.

Step 2: the host server sends the Android online game account information and game information to an instance of the ARM CPU version Android OS running in the ARM Linux Docker container, and the Android online game App runs on the enhanced ARM CPU version Android OS according to the Android online game account information.

Step 3: when the Android online game App runs, the host server converts the graphic display of the Android online game App from the OpenGL_ES command to a single-channel or multi-channel video stream through the device mapping of the Docker container and the service assistance of the Binder, and sends the single-channel or multi-channel video stream to the Android online game video and remote control mode client running on the mobile terminal device used by the user.

Step 4: the Android online game video and remote control mode client receives and displays the video stream on the current mobile terminal device, acquires the control information executed by the user based on the displayed screen, and uploads the acquired control information to the host server.

Step 5: after receiving the control information, the host server sends the control information to the Android online game App running in the ARM Linux Docker container.

Step 6: during the working process, the Android online game video and remote control mode client is further configured to acquire the performance information of the mobile terminal device (such as the format of the type of the mobile terminal device), and the network status information (such as network delay, packet loss and other information) of the Android online game video and remote control mode client communicating with the Android online game App distributed video and remote control server, and upload the acquired performance information and network status information to the Android online game App distributed video and remote control server. The Android online game App distributed video and remote control server adjusts the size (such as format and parameter) of the video stream to be transmitted and the network transmission parameter (such as the communication layer protocol parameter) in real time according to the received performance information and network status information, so as to better adapt to multiple terminals and multiple networks as well as the real-time transmission bandwidth and condition of the network.

The steps of the method are specifically implemented as follows:

The user operates the smart phone and the sensor thereof at the Android online game video and remote control mode client. The client sends the operation action information and sensor information to the host server through the input protocol, and transmits them to an Android online game App in the Android OS in the corresponding Docker container through the host server, so as to control the Android online game App through the operation action and sensor information. After being controlled, the Android online game App calls the own Mesa library of the Android OS through the LibDRM of the Android OS and uses the ARM Linux local graphics card mapped through the Docker to render and mix the images, and then transmits the synthesized image's BO identification to the host server through the socket. After the host server receives the image's BO identification, the host server calls VAAPI library to perform the compressing to form the video stream, and then transmits, through the protocol, the video stream to the Android online game video and remote control mode client for display.

What is claimed is:

1. A distributed multi-terminal and multi-network supporting system for a mobile operating system (OS) online game application (App), comprising:
   an online game server, wherein the online game server is configured to store a mobile OS online game account information and game information of a user; and
   a mobile OS online game App distributed video and remote control server, wherein the mobile OS online game App distributed video and remote control server establishes network communication with the online game server, and a mobile OS online game video and remote control mode client, respectively, and the mobile OS online game App distributed video and remote control server comprises an Advanced Reduced Instruction Set Computer (RISC) Machines (ARM) central processing unit (CPU) version mobile OS, a multi-instance ARM open-source OS-level virtualization container, a host server, and an ARM CPU version open-source OS; wherein, the multi-instance ARM open-source OS-level virtualization container and the host server run on the ARM CPU version open-source OS;
   wherein, multiple instances of the ARM CPU version mobile OS run in each ARM open-source OS-level virtualization container, and the mobile OS online game App runs on the ARM CPU version mobile OS.

2. The distributed multi-terminal and multi-network supporting system according to claim 1, wherein, the host server is configured as an interactive in-and-out port between the mobile OS online game App distributed video and remote control server and the online game server; the host server acquires the mobile OS online game account information and the game information of the user from the online game server, and sends the mobile OS online game account information and the game information to the mobile OS online game App on the ARM CPU version mobile OS running in the multi-instance ARM open-source OS-level virtualization container to enable the mobile OS online game App to run interactively on the online game server; the host server modifies the mobile OS online game account information according to a running result of the mobile OS online game App, and the mobile OS online game account information is stored by the online game server;
   the host server is further configured as an interactive port between the mobile OS online game App distributed video and remote control server and the mobile OS online game video and remote control mode client; when the mobile OS online game App runs, the host server converts a graphic display of the mobile OS online game App from an OpenGLES command to a single-channel or multi-channel video stream through a device mapping of the multi-instance ARM open-source OS-level virtualization container and a service assistance of a Binder, and sends the single-channel or multi-channel video stream to the mobile OS online game video and remote control mode client; the host server receives control information uploaded by the mobile OS online game video and remote control mode client and sends the control information to the mobile OS online game App running in the multi-instance ARM open-source OS-level virtualization container; and the host server serves the mobile OS online game video and remote control mode client; the mobile OS online game video and remote control mode client runs on a mobile terminal device, and plays the single-channel or multi-channel video stream received from the online game App distributed video and remote control server; the mobile OS online game video and remote control anode client is configured to acquire the control information and upload the control information to the mobile OS online game App distributed video and remote control server.

3. The distributed multi-terminal and multi-network supporting system according to claim 2, wherein, the host server further comprises a display control unit, a video stream service layer, a control management unit, a control service layer, a Mesa library, a LibDRM and a VAAPT library.

4. The distributed multi-terminal and multi-network supporting system according to claim 1, wherein, the mobile OS online game video and remote control mode client is further configured to acquire performance information of a mobile terminal device, and network status information of the mobile OS online game video and remote control mode client communicating with the mobile OS online game App distributed video and remote control server, and upload the performance information and the network status information to the mobile OS online game App distributed video and remote control server; the mobile OS online game App distributed video and remote control server adjusts a size of a video stream to be transmitted and a network transmission parameter in real time according to the performance information and the network status information.

5. The distributed multi-terminal and multi-network supporting system according to claim 1, wherein, the mobile OS online game video and remote control mode client comprises a vide© stream client library, a control module of an operating system, a terminal, and a network information acquisition module; wherein the operating system is run by a mobile terminal device with the mobile OS online game video and remote control mode client.

6. A distributed multi-terminal and multi-network supporting method for the mobile OS online game App based on the distributed multi-terminal and multi-network supporting system of claim 1, comprising the following steps:

step 1: sending login information to the mobile OS online game App distributed video and remote control server by the user, and acquiring the mobile OS online game account information and the game information according to the login information by the host server, wherein the mobile OS online game account information and the game information are stored in the online game server;

step 2: sending the mobile OS online game account information and the game information to an instance of the ARM CPU version mobile OS running in the multi-instance ARM open-source OS-level virtualization container by the host server, and running the mobile OS online game App on the ARM CPU version mobile OS according to the mobile OS online game account information and the game information;

step 3: when the mobile OS online game App runs, converting a graphic display of the mobile OS online game App from an OpenGL ES command to a single-channel or multi-channel video stream by the host server through a device mapping of the multi-instance ARM open-source OS-level virtualization container and a service assistance of the Binder, and sending the single-channel or multi-channel video stream to the mobile OS online game video and remote control mode client running on a mobile terminal device used by the user;

step 4: receiving and displaying the single-channel or multi-channel video stream on the mobile terminal device by the mobile OS online game video and remote control mode client, acquiring control information, and uploading the control information to the host server, wherein the control information is executed by the user based on a displayed screen; and step 5: receiving and sending the control information, by the host server, to the mobile OS online game App running in the multi-instance ARM open-source OS-level virtualization container.

7. The distributed multi-terminal and multi-network supporting method according to claim 6, further comprising the following steps:

during a working process, further acquiring, by the mobile OS online game video and remote control mode client, performance information of the mobile terminal device, and network status information of the mobile OS online game video and remote control mode client communicating with the mobile OS online game App distributed video and remote control server, uploading the performance information and the network status information to the Android mobile OS online game App distributed video and remote control server, and adjusting a size of a video stream to be transmitted and a network transmission parameter real time by the mobile OS online game App distributed video and remote control server according to the performance information and the network status information.

* * * * *